United States Patent
Liang

(10) Patent No.: US 11,132,436 B2
(45) Date of Patent: Sep. 28, 2021

(54) FPGA CLOUD HOST DEVELOPMENT METHOD AND SYSTEM

(71) Applicant: Alibaba Group Holding Limited, Grand Cayman (KY)

(72) Inventor: Chen Liang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/930,113

(22) Filed: May 12, 2020

(65) Prior Publication Data

US 2020/0272730 A1    Aug. 27, 2020

Related U.S. Application Data

(63) Continuation of application No. PCT/CN2018/113901, filed on Nov. 5, 2018.

(30) Foreign Application Priority Data

Nov. 13, 2017  (CN) .......................... 201711117784.6

(51) Int. Cl.
```
G06F 21/51      (2013.01)
G06F 30/34      (2020.01)
G06F 9/455      (2018.01)
G06F 111/04     (2020.01)
```
(52) U.S. Cl.
CPC .......... *G06F 21/51* (2013.01); *G06F 9/45533* (2013.01); *G06F 30/34* (2020.01); *G06F 2111/04* (2020.01); *G06F 2221/033* (2013.01)

(58) Field of Classification Search
CPC ...... G06F 21/51; G06F 30/34; G06F 9/45533; G06F 2111/04; G06F 2221/033; G06F 8/65; G06F 8/73; G06F 21/53

USPC ......................................................... 726/22
See application file for complete search history.

(56) References Cited

U.S. PATENT DOCUMENTS

| | | |
|---|---|---|
| 2010/0325597 A1 | 12/2010 | Arsintescu |
| 2015/0301570 A1 | 10/2015 | Fine |
| 2016/0321390 A1 | 11/2016 | Bozman et al. |
| 2016/0342815 A1 | 11/2016 | Chritz et al. |

(Continued)

FOREIGN PATENT DOCUMENTS

| | | |
|---|---|---|
| CN | 101976431 A | 2/2011 |
| CN | 103699399 A | 4/2014 |
| CN | 106155661 A | 11/2016 |

OTHER PUBLICATIONS

Translation of International Search Report dated Feb. 1, 2019, from corresponding PCT Application No. PCT/CN2018/113901, 2 pages.

(Continued)

*Primary Examiner* — Jeffrey C Pwu
*Assistant Examiner* — Nega Woldemariam
(74) *Attorney, Agent, or Firm* — Lee & Hayes, P.C.

(57) ABSTRACT

A method including detecting, in response to a design file uploaded by a development device, validity of an actual constraint file included in the design file and corresponding to an FPGA of the FPGA cloud host; synthesis processing the design file in response to detecting that the actual constraint file is valid; and writing a burner file obtained from the synthesis processing into the FPGA. The validity of the actual constraint file is detected to prevent a malicious attack of a user to FPGA hardware.

18 Claims, 6 Drawing Sheets

(56) References Cited

U.S. PATENT DOCUMENTS

| | | | |
|---|---|---|---|
| 2017/0109469 A1* | 4/2017 | Kanshin | G06F 30/398 |
| 2017/0195173 A1 | 7/2017 | Izenberg | |
| 2018/0165478 A1 | 6/2018 | Stitt et al. | |
| 2018/0196951 A1 | 7/2018 | Hoppert | |
| 2018/0270068 A1 | 9/2018 | Innis et al. | |
| 2018/0302281 A1* | 10/2018 | Khan | H04L 67/34 |

OTHER PUBLICATIONS

Translation of Written Opinion dated Feb. 1, 2019, from corresponding PCT Application No. PCT/CN2018/113901, 4 pages.
Extended European Search Report dated Jul. 16, 2021 for European Patent Application No. 18875358.6, a foreign counterpart to U.S. Appl. No. 15/930,113, 12 pages.
Xilinx, "Vivado Design Suite User Guide, Using the Vivado IDE," retrieved from <<https://www.xilinx.com/support/documentation/sw_manuals/xilinx2017_3/ug893-vivado-ide.pdf>>, Oct. 4, 2017.

* cited by examiner

SEND TEMPLATE CONSTRAINT FILE CORRESPONDING TO FPGA OF FPGA CLOUD HOST TO DEVELOPMENT DEVICE IN RESPONSE TO DEVELOPMENT REQUEST TRIGGERED BY DEVELOPMENT DEVICE
S302

DETECT, IN RESPONSE TO DESIGN FILE UPLOADED BY DEVELOPMENT DEVICE, VALIDITY OF ACTUAL CONSTRAINT FILE CORRESPONDING TO FPGA OF FPGA CLOUD HOST AND INCLUDED IN DESIGN FILE
S304

SYNTHESISLY PROCESS DESIGN FILE IF IT IS DETECTED THAT ACTUAL CONSTRAINT FILE IS VALID
S306

FEED SYNTHESIS REPORT OBTAINED AFTER SYNTHESIS PROCESSING BACK TO DEVELOPMENT DEVICE
S308

WRITE, IN RESPONSE TO WRITING INSTRUCTION TRIGGERED BY DEVELOPMENT DEVICE, BURNER FILE CORRESPONDING TO WRITING INSTRUCTION INTO FPGA, WHEREIN BURNER FILE IS OBTAINED AFTER SYNTHESIS PROCESSING
S310

FIG. 3

SEND DEVELOPMENT REQUEST TO DEVELOPMENT MANAGEMENT PLATFORM IN RESPONSE TO DEVELOPMENT START OPERATION TRIGGERED BY USER
S402

RECEIVE TEMPLATE CONSTRAINT FILE CORRESPONDING TO FPGA OF FPGA CLOUD HOST WHICH IS SENT BY DEVELOPMENT MANAGEMENT PLATFORM IN RESPONSE TO DEVELOPMENT REQUEST
S404

UPLOAD DESIGN FILE TO DEVELOPMENT MANAGEMENT PLATFORM, WHEREIN DESIGN FILE INCLUDES ACTUAL CONSTRAINT FILE CORRESPONDING TO FPGA OF FPGA CLOUD HOST FOR DETECTING, BY DEVELOPMENT MANAGEMENT PLATFORM, VALIDITY OF ACTUAL CONSTRAINT FILE AND SYNTHESISLY PROCESSING DESIGN FILE WHEN IT IS DETECTED THAT ACTUAL CONSTRAINT FILE IS VALID
S406

RECEIVE SYNTHESIS REPORT SENT BY DEVELOPMENT MANAGEMENT PLATFORM
S408

SEND, TO DEVELOPMENT MANAGEMENT PLATFORM, WRITING INSTRUCTION CONFIGURED TO INSTRUCT WRITING BURNER FILE CORRESPONDING TO DESIGN FILE INTO FPGA
S410

FIG. 4

FPGA CLOUD HOST DEVELOPMENT METHOD AND SYSTEM

CROSS REFERENCE TO RELATED PATENT APPLICATIONS

This application claims priority to and is a continuation of PCT Patent Application No. PCT/CN2018/113901, filed on 5 Nov. 2018 and entitled "FPGA CLOUD HOST DEVELOPMENT METHOD AND SYSTEM," which claims priority to Chinese Patent Application No. 201711117784.6 filed on 13 Nov. 2017 and entitled "FPGA CLOUD HOST DEVELOPMENT METHOD AND SYSTEM," which are incorporated herein by reference in its entirety.

TECHNICAL FIELD

The present disclosure relates to the field of Internet technologies, and, more particularly, to an FPGA cloud host development method and system.

BACKGROUND

An FPGA cloud host, also referred to as an FPGA cloud server, is a computing service based on a Field Programmable Gate Array (FPGA). On one hand, it is a hardware architecture belonging to a heterogeneous computing platform that improves computing performance, energy efficiency ratio and real-time computation of a server through parallel computation. The FPGA cloud host also implements underlying hardware acceleration for an application. On the other hand, cloud services are provided to users, so that the users may pay for the use of FPGAs on demand, thus greatly reducing the cost of using FPGAs.

The FPGA cloud host may be understood as a common cloud host (virtual machine) with an FPGA device. After purchasing an FPGA cloud host, if the user wants to use an FPGA therein, he/she needs to develop the FPGA to obtain a burner file and then write the file into the FPGA. The FPGA thus implements the function developed by the user.

In a conventional FPGA development environment and process, users develop and debug FPGAs in their own offline environments, that is, user-side environments, and FPGA hardware is owned by developers. However, in the context of FPGA cloud hosts, the development of FPGAs will face some new security challenges, and it is necessary to not only ensure that the user may develop FPGAs, but also ensure the security of the cloud hosts to prevent malicious attacks.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

FPGA cloud host development methods and systems are provided in example embodiments of the present disclosure to achieve the development of FPGAs by users and preventing malicious attacks to FPGA hardware.

In an example embodiment, an FPGA cloud host development method applied to a development management platform is provided in the example embodiments of the present disclosure, the method comprising:

detecting, in response to a design file uploaded by a development device, validity of an actual constraint file included in the design file, the actual constraint file corresponding to an FPGA of the FPGA cloud host;

synthesis processing the design file in response to detecting that the actual constraint file is valid; and writing a burner file obtained from the synthesis processing into the FPGA.

For example, before the writing a burner file obtained from the synthesis processing into the FPGA, the method further comprises:

feeding a synthesis report obtained from the synthesis processing back to the development device; and the writing a burner file obtained from the synthesis processing into the FPGA comprises:

writing, in response to a writing instruction triggered by the development device, the burner file corresponding to the writing instruction into the FPGA.

In an example embodiment, an FPGA cloud host development method applied to a development device is provided in the example embodiments of the present disclosure, the method comprising:

uploading a design file to a development management platform, wherein the design file comprises an actual constraint file corresponding to an FPGA of the FPGA cloud host, for detecting, by the development management platform, validity of the actual constraint file and synthesis processing the design file in response to detecting that the actual constraint file is valid;

receiving a synthesis report sent by the development management platform; and sending, to the development management platform, a writing instruction triggered according to the synthesis report, the writing instruction instructing to write a burner file corresponding to the design file into the FPGA.

In an example embodiment, an FPGA cloud host development system is provided in the example embodiments of the present disclosure, comprising:

a development device, a development management platform in remote communication with the development device, and an FPGA in an FPGA cloud host, wherein the development device is configured to design a design file comprising an actual constraint file corresponding to the FPGA, and upload the obtained design file to the development management platform; and the development management platform is configured to detect validity of the actual constraint file, synthesis process the design file in response to detecting that the actual constraint file is valid, and write a burner file obtained from the synthesis processing into the FPGA.

In an example design, a processor and a memory are included in the structure of the above development management platform. The memory is configured to store a program for supporting the development management platform to implement the FPGA cloud host development method in the above method embodiments, and the processor is configured to execute the program stored in the memory. The development management platform may further include a communication interface for the development management platform to communicate with another device or communication network.

A computer storage medium configured to store computer software instructions used by a development management platform is provided in the example embodiments of the present disclosure, and comprises a program for implementing the FPGA cloud host development method in the above method embodiment.

In another example design, a processor and a memory are included in the structure of the above development device. The memory is configured to store a program for supporting the development device to implement the FPGA cloud host development method in the above method embodiments, and the processor is configured to execute the program stored in the memory. The development device may further include a communication interface for the development device to communicate with another device or communication network.

Another computer storage medium configured to store computer software instructions used by a development device is provided in the example embodiments of the present disclosure, and comprises a program for implementing the FPGA cloud host development method in the above method embodiments.

According to the FPGA cloud host development method and system provided in the example embodiments of the present disclosure, a user may develop and design an FPGA in a development device at the user side to obtain a design file comprising an actual constraint file actually designed by the user for the FPGA, and then upload the design file to a development management platform through the development device. The development management platform detects validity of the actual constraint file to prevent the user from attacking the FPGA maliciously by changing the constraint file, thus ensuring the security of FPGA hardware.

BRIEF DESCRIPTION OF THE DRAWINGS

In order to illustrate the technical solutions in the example embodiments of the present disclosure more clearly, the accompanying drawings to be used in the description of the example embodiments will be introduced briefly below. It is apparent that the accompanying drawings in the following description merely represent some example embodiments of the present disclosure. Those of ordinary skill in the art may also obtain other drawings according to the accompanying drawings without creative efforts.

FIG. 3 is a flowchart of an FPGA cloud host development method according to an example embodiment of the present disclosure;

FIG. 4 is a flowchart of an FPGA cloud host development method according to an example embodiment of the present disclosure;

DETAILED DESCRIPTION

In order to make the objectives, technical solutions, and advantages of the example embodiments of the present disclosure clearer, the technical solutions in the example embodiments of the present disclosure will be clearly and fully described below with reference to the accompanying drawings in the example embodiments of the present disclosure. It is obvious that the example embodiments to be described merely represent a part of rather than all of the example embodiments of the present disclosure. All other example embodiments obtained by those of ordinary skill in the art based on the example embodiments of the present disclosure without creative efforts are encompassed in the protection scope of the present disclosure.

The terms used in the example embodiments of the present disclosure are only for the purpose of describing a particular example embodiment, and are not intended to limit the present disclosure. The singular forms "one," "said" and "the" used in the example embodiments of the present disclosure and the appended claims are also intended to include plural forms, unless other meanings are clearly indicated in the context, and "a plurality of" generally includes at least two, but does not exclude the case where at least one is included.

It should be understood that the term "and/or" used in this text is simply an association that describes associated objects, indicating that there may be three relationships. For example, A and/or B may indicate three cases: only A exists, both A and B exist, and only B exists. In addition, the character "/" in this text generally means that the associated objects before and after the character are in an "or" relationship.

Depending on the context, the words "if" and "in case" used here may be interpreted as "when . . . ," "as . . . ," or "in response to determining" or "in response to detecting." Similarly, depending on the context, the phrase "if determining" or "if detecting (stated condition or event)" may be interpreted as "when determining" or "in response to determining" or "when detecting (stated condition or event)" or "in response to detecting (stated condition or event)."

It should also be noted that the terms "include," "comprise," or their any other variations are intended to cover non-exclusive inclusion, so that a commodity or system including a series of elements not only includes the elements clearly listed, but also includes other elements not clearly listed or elements inherent to the commodity or system. Without more restrictions, an element defined by the expression "including a/an" does not exclude that other identical elements may also exist in the commodity or system including the element.

It is further worth noting that the sequence between the steps in the example embodiments of the present disclosure is adjustable and the steps are not necessarily performed in the sequence illustrated below.

Figure 1:
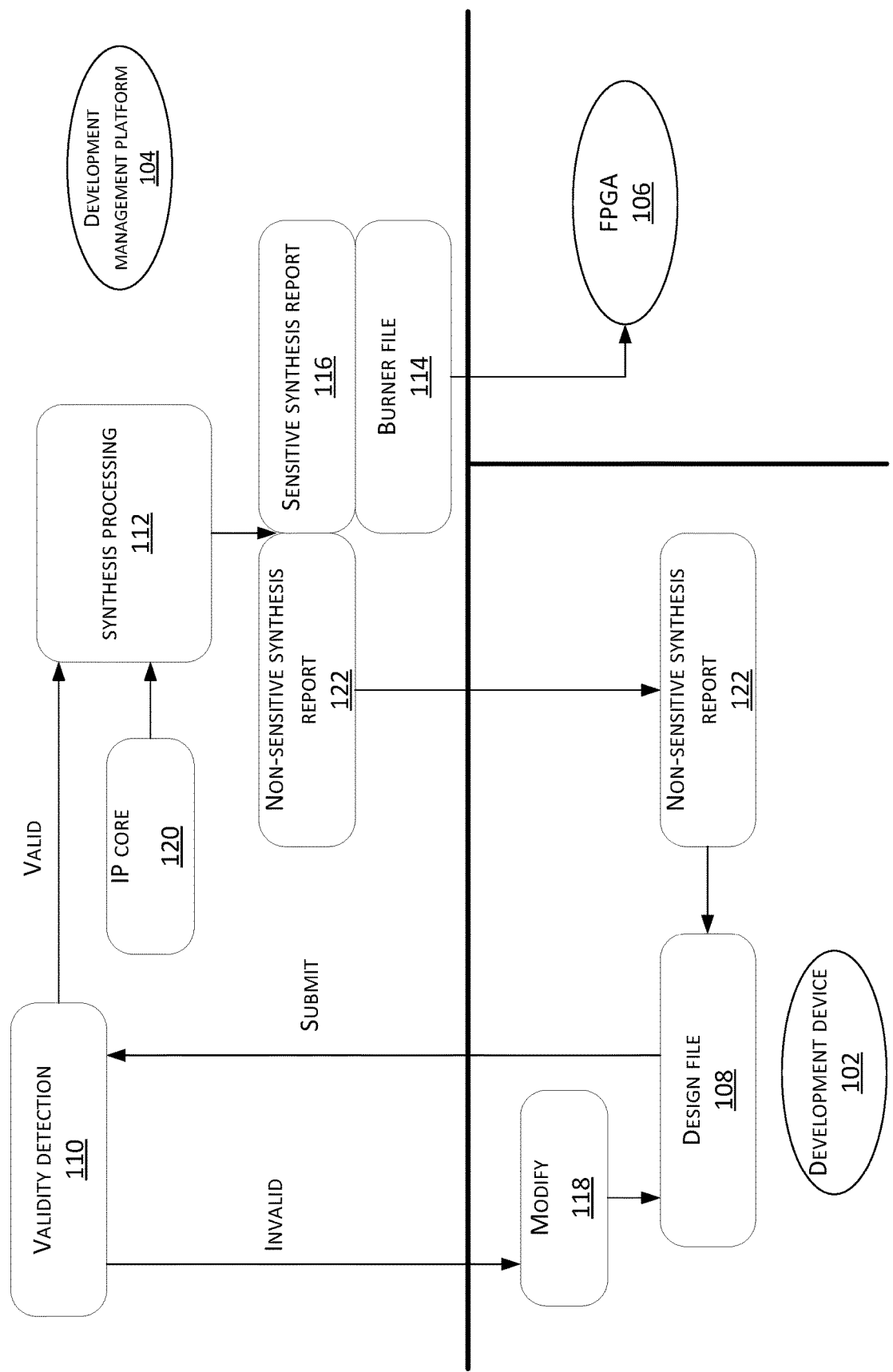
FIG. 1 is a schematic structural diagram of an FPGA cloud host development system according to an example embodiment of the present disclosure.

FIG. 1 is a schematic structural diagram of an FPGA cloud host development system according to an example embodiment of the present disclosure. As shown in FIG. 1, the system includes:

a development device 102, a development management platform 104 in remote communication with the development device 102, and an FPGA 106 in an FPGA cloud host.

The development device 102 is a development device owned at a user side, and the development management platform 104 is a network-side or cloud management platform, which may be, for example, a server. The development device 102 and the development management platform 104 may be understood as a relationship between a client terminal and a server, that is, the development device 102 may be provided with a client terminal that supports user development.

The development device 102 is selected by a user, and is a device for FPGA development. For example, it may be an offline device of the user, such as a computer of the user, or a virtual machine of the FPGA cloud host. In general, the user may carry on works related to FPGA design and development in this device, such as coding, constraint design, and viewing a synthesis report.

In detail, the development device 102 is configured to allow the user to design a design file 108, and upload the obtained design file 108 to the development management platform 104. The design file 108 includes an actual constraint file corresponding to the FPGA 106. Correspondingly, the development management platform 104 is configured to conduct validity detection 110 of the actual constraint file, conduct synthesis processing 112 of the design file 108 in response to detecting that the actual constraint file is valid, and write a burner file 114 obtained from the synthesis processing 112 into the FPGA 106.

In an example embodiment, the development device 102 is further configured to receive a synthesis report such as a sensitive synthesis report 116 obtained from the synthesis processing 112 and fed back by the development management platform 104, and send a writing instruction triggered according to the sensitive synthesis report 116 to the development management platform 104. Correspondingly, the development management platform 104 is further configured to feed the sensitive synthesis report 116 obtained from the synthesis processing 112 back to the development device 102; and write the burner file 114 obtained from the synthesis processing 112 into the FPGA 106 according to the writing instruction.

In an actual application, the user writes code for a development file required by himself/herself in the development device and may compile and debug the written code to finally form the design file 108. The design file 108 may include the code written by the user as well as a constraint file actually designed, referred to as an actual constraint file.

When the written code is compiled, a constraint file of the FPGA 106 is often needed, and it is referred to as a template constraint file to be distinguished from the actual constraint file. Therefore, the development device 102 is further configured to send a development request to the development management platform 104 in response to a development start operation triggered by the user, for requesting the template constraint file. Accordingly, the development management platform 104 is further configured to send the template constraint file to the development device 102 in response to the development request.

The user develops the FPGA cloud host purchased by himself/herself, and the development management platform 104 may be regarded as a unified management platform, which may assist different users to develop their respective FPGA cloud hosts. Therefore, a setting item of identification information for the FPGA cloud host of the user may be provided in the development device 102. After the user fills in the setting item and triggers a preset control or menu item, it is considered that the user has triggered a development start operation. Thus, the identification information of the FPGA cloud host may be carried in the development request sent by the development device 102 to the development management platform 104, so that the development management platform 104 acquires a template constraint file of the FPGA 106 in the FPGA cloud host based on the identification information, and feeds the obtained template constraint file back to the development device 102. For example, the template constraint files corresponding to the FPGAs in the plurality of FPGA cloud hosts may be pre-stored in the development management platform 104 by taking the identification information of the FPGA cloud hosts as a storage index.

For example, the function of the constraint file mentioned in the example embodiments of the present disclosure is to define chip pins to which the FPGA input and output signals are bound, that is, which pin of the FPGA a signal is input from and which pin of the FPGA a signal is output from. In addition, the constraint file further defines various clock relationships, level standards and so on in the FPGA, as well as some other constraints.

The development management platform 104 provides the template constraint file of the FPGA 106 to be developed by the user to the user through the development device 102. However, during the actual development, the user may perform modification, deletion, addition and other operations on the template constraint file to thus form an actual constraint file actually designed, and the operations may damage the FPGA itself and its surrounding hardware and software systems. Therefore, in order to ensure the security of the FPGA and prevent malicious attacks from the user, after the user submits, i.e., uploads the design file 108 to the development management platform 104 through the development device 102, the development management platform 104 needs to conduct validity detection 110 of the design file 108, such as detecting validity of the actual constraint file in the design file 108. For example, the development management platform 104 may compare the template constraint file corresponding to the FPGA 106 and stored locally with the actual constraint file, and determine that the actual constraint file is valid if the result of comparison indicates that the template constraint file is consistent with the actual constraint file. The template constraint file being consistent with the actual constraint file means that various constraints included in the two files are correspondingly the same. For example, when a signal is constrained to be input from a pin of the FPGA in the actual constraint file, if the signal is also constrained to be input from the pin in the template constraint file, the signal input constraints on the pin are consistent in the two files.

When the development management platform 104 detects that the actual constraint file is invalid, an error prompt message may be sent to the development device 102 to allow the user to re-design or modify 118 the design file 108. When the development management platform 104 detects that the actual constraint file is valid, the design file 108 uploaded by the development device may then be synthesis processed. In an actual application, the synthesis processing 112 may be achieved by using an existing synthesis tool. Therefore, the development management platform 104 is provided with a synthesis tool.

The synthesis processing 112 includes three steps: analysis, synthesis, and optimization. The design file may be described in a Hardware Description Language (HDL). The analysis means analyzing an HDL design file by using a standard HDL grammar rule and correcting grammatical errors. The synthesis means taking a selected FPGA structure and device as targets to logically synthesize HDL and FPGA netlist files, and compile the design file into a logical connection netlist composed of an AND gate, an OR gate, a non-gate, an RAM, a flip-flop and other basic logic units, rather than a real gate-level circuit. The optimization means logically optimizing the speed and area according to design constraints of the user to produce an optimized FPGA netlist file for use by FPGA layout and wiring tools. A number of synthesis reports and burner files may be output after the completion of synthesis. The synthesis reports include, for example, a timing report, a power report, a temperature report, and so on, and the burner files may be compared to executable files compiled by an application. Synthesis statuses and synthesis results, such as resource usage and level information after the synthesis, are listed in the report files.

For example, in the development process of the FPGA cloud host, the user may use a third-party IP core 120, that is, third-party intellectual property cores, in order to avoid repeated development. The user may the IP core 120 after authorization (by purchasing or other manners).

To put it simply, the IP core 120 is a module that implements a function. The user may directly call the IP core 120 in the application code to implement the corresponding function, which is equivalent to directly using an existing functional module to avoid repeated development.

Although the third-party IP core 120 may improve the development efficiency of the user and avoid repeated development, there is a need to technically prevent the user from outputting the IP core 120 to his/her own device, because once the IP core 120 is spread out, the user may provide the IP core 120 to any other unauthorized users or spread them to the Internet, etc., leading to a problem of "one purchase, all use." Therefore, in order to ensure that the use of the third-party IP core 120 is safe and the third-party IP core 120 is not spread to unauthorized users, a solution of protecting the third-party IP core 120 is further provided in the example embodiments of the present disclosure.

For example, the development management platform 104 may acquire the available third-party IP core 120 authorized for the user in advance and store the third-party IP core 120 locally, that is, third-party IP core 120 available to the user is stored in the development management platform 104. As the setting item of the identification information of the FPGA cloud host described above, the development device 102 may be further provided with a setting item of a user ID, and thus the user ID may also be included in the above development request. Therefore, corresponding third-party IP cores 120 may be acquired by the development management platform 104 based on the user ID from a server in which the third-party IP cores are maintained.

In the example embodiments of the present disclosure, the third-party IP cores 120 are stored in the development management platform 104 but are not exposed to the user, that is, not provided to the development device 102 of the user.

When the user needs to use a third-party IP core 120 in the development process, it may be used by calling. For example, function description and input parameters of the third-party IP cores 120 available to the user may be provided to the user, so that the user may choose to call the third-party IP core 120 according to an actual requirement. Therefore, when the user needs to call the third-party IP core 120 in the development process, the user only needs to write calling code for calling the third-party IP core 120 in the design file 108, which is equivalent to declaring which third-party IP core 120 needs to be called.

When the user calls the third-party IP core 120, the development management platform 104 is further configured to: if the third-party IP core 120 is called in the design file 108, conduct synthesis processing 112 of the called third-party IP core 120 and the design file 108, and feed a predefined non-sensitive synthesis report 122 obtained from the synthesis processing 112 back to the development device 102, wherein information of the called third-party IP core 120 is not included in the non-sensitive synthesis report 122.

In other words, when a third-party IP core 120 is called in the design file 108 of the user, in addition to the design file 108, the called third-party IP core 120 is also included in the input of the synthesis processing 112. For example, whether a third-party IP core 120 is called and which third-party IP core 120 is called may be determined by the development management platform 104 by analyzing whether the name of the third-party IP core 120 is included in the design file 108.

In addition, in the example embodiments of the present disclosure, in order to protect the third-party IP core 120, in addition to not exposing the third-party IP core 120 to the user, the synthesis report in the synthesis result from which the third party IP core 120 may be reverse engineered or extracted is not provided to the user. Thus, after performing synthesis processing 112 on the called third-party IP core 120 and the design file 108, the development management platform 104 only feeds a predefined non-sensitive synthesis report 122 in the result of the synthesis processing 112 back to the development device 102, wherein information of the called third-party IP core 120 is not included in the non-sensitive synthesis report 122, that is, it is the synthesis report from which the third party IP core 120 cannot be reverse engineered or extracted.

The quantity and types of synthesis reports obtained from the synthesis processing 112 are often fixed, and therefore, for example, the synthesis reports are likely to include relevant information of third-party IP cores may be predefined and such synthesis reports are defined as sensitive synthesis reports 116, and other synthesis reports are defined as non-sensitive synthesis reports 122.

Therefore, the third-party IP cores 120 may be protected by not feeding the third-party IP cores and the synthesis result including information of the third-party IP cores back to the user.

Then, by analyzing the synthesis report received through the development device 102, the user may determine whether the design file 108 for the FPGA further needs to be modified. If it needs to be modified, the design file 108 will be re-designed, and then uploading, validity detection 110, synthesis processing 112, and other processing of the above design file 108 will be triggered again. If it does not need to be modified, the user may trigger a writing instruction for the current design file 108 through the development device 102, which indicates the burner file corresponding to which design file 108 needs to be written into the FPGA.

For example, an ID of the design file 108 such as the name of the design file 108 and a checkbox and a writing control corresponding to the design file 108 may be displayed in the development device 102, and the user may trigger the above writing instruction by selecting the checkbox of the design file 108 and clicking the corresponding writing control. Thus, the development management platform 104 may acquire, according to the ID of the design file 108 carried in the writing instruction, the design file 108 corresponding to the burner file the user wants to program, thus writing the burner file obtained from the synthesis processing 112 of the design file 108 into the FPGA 106.

In practice, the user may develop a plurality of design files in the development process, and different design files will be synthesized by the development management platform to produce different burner files. The burner files corresponding to different design files obtained after the synthesis are stored in the development management platform, and which burner file should be written into the FPGA may be selected by the user.

Figure 2:
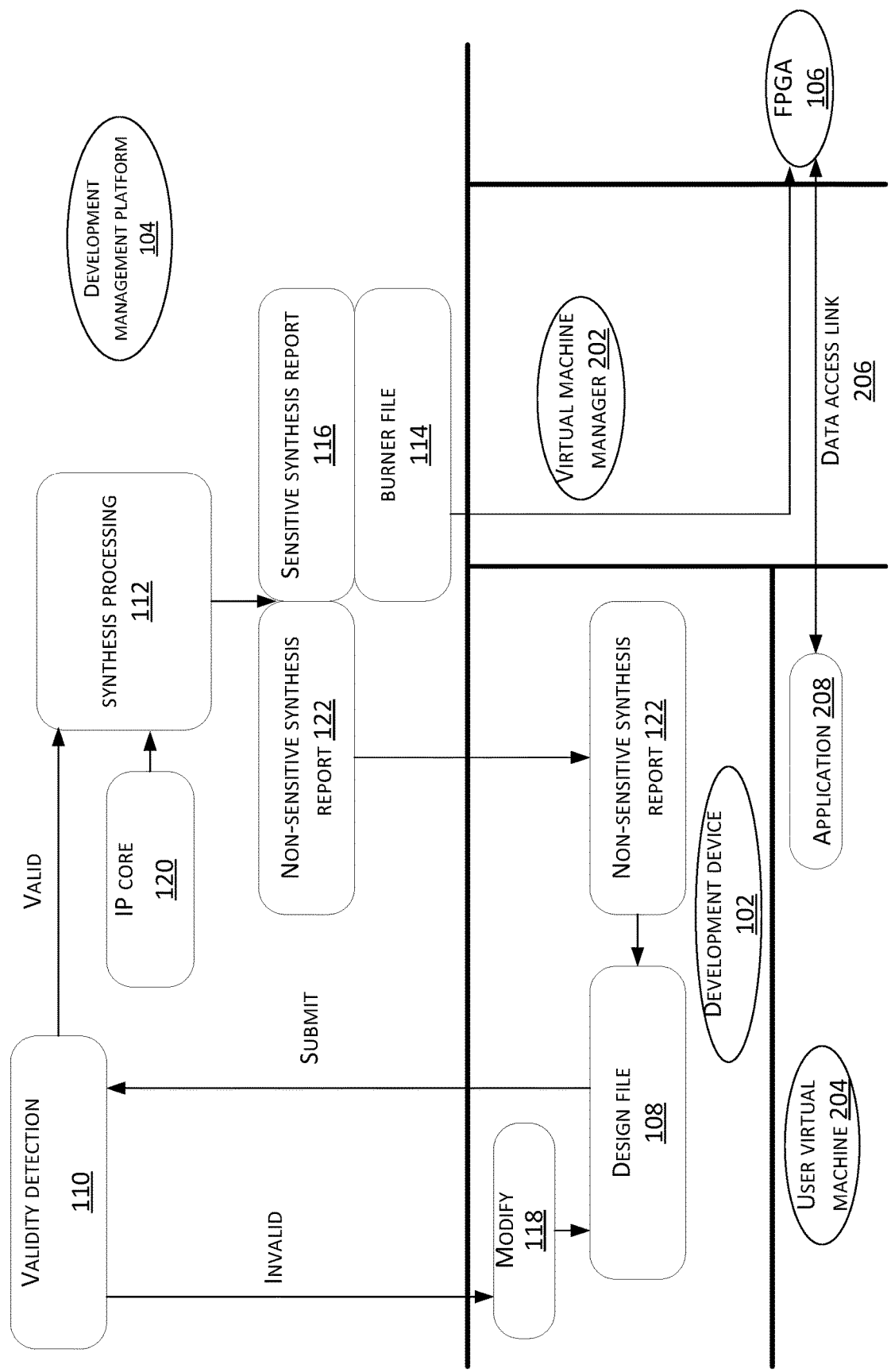
FIG. 2 is a schematic structural diagram of an FPGA cloud host development system according to an example embodiment of the present disclosure.

As shown in FIG. 2, for example, the FPGA cloud host development system may further include a virtual machine manager 202 (Hypervisor) corresponding to the FPGA cloud host, that is, for managing the FPGA cloud host. Thus, the writing of the burner file into the FPGA 106 may be achieved by the development management platform 104 through the virtual machine manager 202. For example, the virtual machine manager 202 is configured to receive the burner file 114 sent by the development management platform 104, and write the burner file 114 into the FPGA 106 by running a preset writing program.

In addition, as shown in FIG. 2, the FPGA cloud host development system further includes a user virtual machine 204 having a data access link 206 with the FPGA 106, configured to deploy code in the design file to form the application 208 and access the FPGA 106 through the data access link 206.

The user virtual machine 204 is a virtual machine delivered to the user, in which the user may see an FPGA device, deploy his/her own design code, and access the FPGA device through a data link.

The virtual machine manager 202 manages the user virtual machine 204 and the FPGA cloud host, the user cannot enter the virtual machine manager 202, but the virtual machine manager 202 does not expose a download link of the FPGA 106 to the user virtual machine 204. Therefore, the user cannot initiate a download operation directly for the FPGA 106 in the user virtual machine 204, that is, the user cannot directly write the burner file 114 into the FPGA 106. The download link of the FPGA 106 will not be exposed to the user, so the user cannot perform download type operations on the FPGA 106 and only may perform an access operation, thus preventing the user from writing the burner file 114 including malicious attack elements into the FPGA 106. In addition, the burner file 114 written into the FPGA 106 through the virtual machine manager 202 is from the synthesis result of the design file 108 after the validity detection 110, thus also preventing the malicious attacks to the FPGA 106.

In conclusion, a user may develop and design the FPGA 106 in the development device 102 at the user side to obtain the design file 108 including an actual constraint file actually designed by the user for the FPGA 106, and then upload the design file 108 to the development management platform 104 through the development device 102. The development management platform 104 performs validity detection 110 of the actual constraint file to prevent the user from maliciously attacking the FPGA 106 by changing the constraint file. Then, the development management platform 106 conducts synthesis processing 112 of the design file 108, feeds a synthesis report in the result of the synthesis processing back to the development device 102 for the user to view, and programs a burner file included in the corresponding result of the synthesis processing 112 into the FPGA in response to a writing instruction triggered by the user for the design file 108 or the synthesis report, thus ensuring the security of FPGA hardware while achieving the development of the FPGA 106.

A development process in the actual use of the above development system is briefly described below with an actual example, which may include the following procedures.

a. The user acquires, through the development device 102, FPGA basic project including project files, top-level files, constraint files and so on.

As described above, the user may trigger sending of a development request to the development management platform 104 by performing a development start operation in a development interface of the development device 102, and in response to the development request, the development management platform 104 may feed the FPGA basic project including the above constraint file, that is, the template constraint file described above, back to the development device of the user, for the user to use for development.

b. The user performs project development in the development device 102, including application coding, simulation, and so on, for obtaining a design file 108.

c. The user submits the design file 108 to the development management platform 104 after completion of the development.

d. The development management platform 104 detects validity of the design file 108 submitted by the user, if it is detected that the design file is invalid, an error prompt message is returned to the user, and the process goes back to step b; and if it is detected that the design file 108 is valid, the process proceeds to the following step.

e. The development management platform 104 determines whether a third-party IP core 120 is called in the design file 108 of the user. If yes, the called third-party IP core 108 and the design file 108 need to be synthesis processed, and if no, the design file 108 is synthesis processed directly.

f. A non-sensitive synthesis result 122 is returned to the development device 102.

g. The user analyzes the synthesis result and determines whether to program (download) the FPGA 106, and if no, the process goes back to step b in which the design file 108 of the FPGA 106 is modified. If yes, the process proceeds to the following step.

h. The development management platform 104 sends a burner file 114 to be written to the virtual machine manager 202, and then the virtual machine manager 202 calls a relevant drive to write to the FPGA 106.

i. The development management platform 104 informs the user that the FPGA 106 is written successfully, and the user starts to access the FPGA 106 through the user virtual machine 204.

FIG. 3 is a flowchart of an FPGA cloud host development method according to an example embodiment of the present disclosure. The FPGA cloud host development method according to this example embodiment is used for implementing the development of an FPGA in the FPGA cloud host by a user. The method is implemented by the development management platform in the above development system. The development management platform may be a server. As shown in FIG. 3, the method includes the following steps.

In S302, a template constraint file corresponding to an FPGA of the FPGA cloud host is sent to a development device in response to a development request triggered by the development device.

Step S302 is an example step. In practice, the user may also obtain the template constraint file in other manners, for example, the user logs in to the FPGA cloud host purchased by himself/herself and obtains the template constraint file through the FPGA cloud host.

In S304, in response to a design file uploaded by the development device, validity of an actual constraint file included in the design file is detected, wherein the actual constraint file corresponds to the FPGA of the FPGA cloud host and included in the design file.

For example, the development management platform may compare a template constraint file stored locally with the actual constraint file in the design file, and determine that the actual constraint file is valid if the result of comparison indicates that the template constraint file is consistent with the actual constraint file; otherwise, determine that the actual constraint file is invalid.

In S306, synthesis processing is applied to the design file in response to detecting that the actual constraint file is valid.

For example, a third-party IP core may be scheduled in the design file of the user. Therefore, if a third-party IP core is called in the design file, the called third-party IP core stored locally and the design file are processed synthesis. Otherwise, if no third-party IP core is called, the design file is processed synthesis.

For example, after the synthesis processing, a burner file obtained from the synthesis processing may be directly written into the FPGA. Processing may also be performed in the following manner.

In S308, a synthesis report obtained from the synthesis processing is fed back to the development device.

Which synthesis reports obtained from the synthesis processing are sensitive synthesis reports and which synthesis reports are non-sensitive synthesis reports may be pre-defined. Information of the called third-party IP core is not included in the non-sensitive synthesis reports. Thus, after the synthesis processing, only the non-sensitive synthesis reports are fed back to the development device.

In S310, in response to a writing instruction triggered by the development device, a burner file corresponding to the writing instruction is written into the FPGA, wherein the burner file is obtained from the synthesis processing.

If the user determines based on the received synthesis report that it is unnecessary to further modify the design file, a writing instruction for a design file may be triggered. The development management platform programs a burner file corresponding to the design file into the FPGA based on the writing instruction. For example, the development management platform may transmit the burner file into the virtual machine manager corresponding to the FPGA cloud host for writing the burner file into the FPGA through the virtual machine manager.

The detailed description process not covered in this example embodiment may be obtained with reference to the description related to the development management platform in the above system example embodiment, which is described in detail here.

In this example embodiment, the development of the FPGA in the FPGA cloud host by the user is completed by remote assistance through the development management platform on the network side. Firstly, validity of the design file uploaded by the user is detected to avoid malicious attacks to FPGA hardware from the user. Secondly, third-party IP cores to be protected are not exposed to the user, the synthesis process is completed at the side of the development management platform, and sensitive parts in the synthesis result are not provided to the user, thus protecting the third-party IP cores. Thirdly, the FPGA is written or written through the development management platform, which also prevents malicious attacks caused by direct writing of the FPGA by the user.

FIG. 4 is a flowchart of an FPGA cloud host development method according to an example embodiment of the present disclosure. The FPGA cloud host development method according to this example embodiment is used for implementing development of an FPGA in the FPGA cloud host by a user. The method is implemented by the development device in the above development system. As shown in FIG. 4, the method includes the following steps.

In S402, a development request is sent to a development management platform in response to a development start operation triggered by the user.

In S404, a template constraint file corresponding to the FPGA of the FPGA cloud host which is sent by the development management platform in response to the development request is received.

It should be noted that steps S402-S404 are example steps. In practice, the template constraint file may also be obtained in other manners, for example, the user logs in to the FPGA cloud host purchased by himself/herself and obtains the template constraint file through the FPGA cloud host.

In S406, a design file is uploaded to the development management platform. The design file includes an actual constraint file corresponding to the FPGA of the FPGA cloud host for detecting, by the development management platform, validity of the actual constraint file and synthesis processing the design file in response to detecting that the actual constraint file is valid.

The user obtains a desired template constraint file through interaction between the development device of the user and the development management platform, for designing a design file. However, in the actual design, the user may change the template constraint file, resulting in damage to the FPGA hardware. Therefore, the design file of the user needs to be submitted to the development management platform for validity detection.

In S408, a synthesis report sent by the development management platform is received.

The synthesis report refers to a non-sensitive synthesis report. The user may determine by analyzing the synthesis report whether the design file needs to be modified. If the design file does not need to be modified, a writing instruction for the design file may be triggered to instruct the development management platform to write a burner file corresponding to the design file into the FPGA.

In S410, a writing instruction configured to instruct writing the burner file corresponding to the design file into the FPGA is sent to the development management platform.

The detailed description process not covered in this example embodiment may be obtained with reference to the description related to the development management platform in the above system example embodiment, which is described in detail here.

In this example embodiment, the user may develop the FPGA in the FPGA cloud host remotely based on the assistance of the development management platform at the network side, which is simple and convenient.

Figure 5:
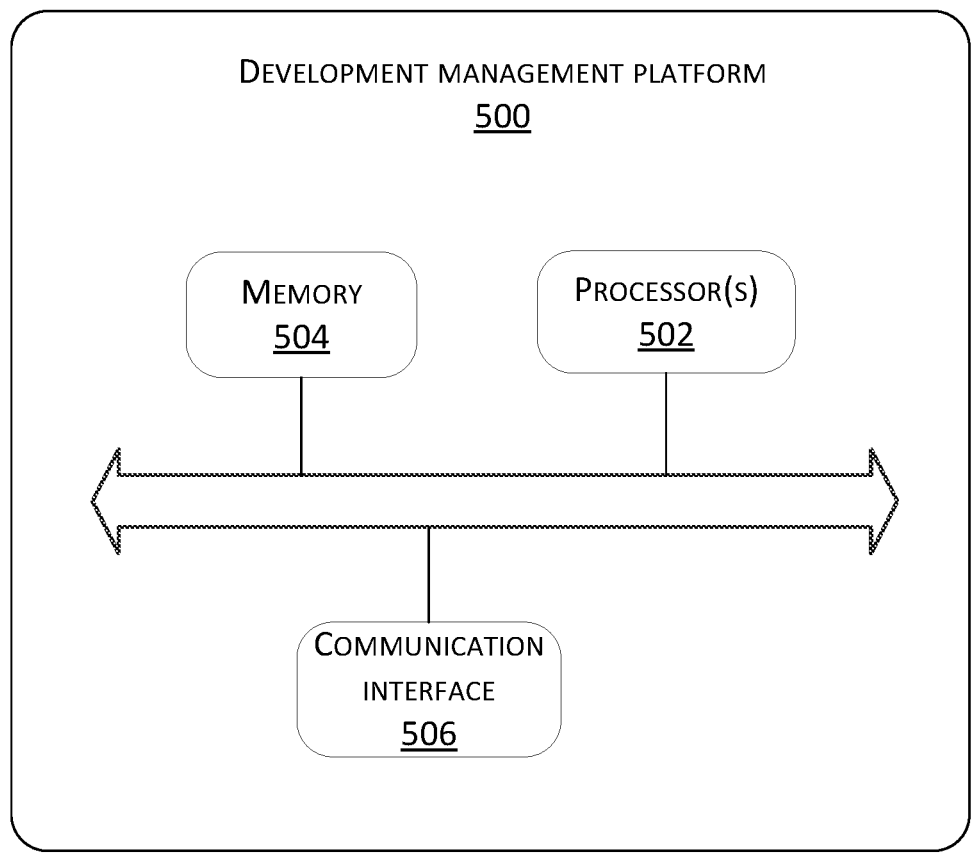
FIG. 5 is a schematic structural diagram of a development management platform according to an example embodiment of the present disclosure.

In an example design, the above development management platform may be implemented as a server. As shown in FIG. 5, the development management platform 500 may include one or more processors 502 and memory 504. The memory 504 is configured to store a program for supporting the development management platform 504 to implement the FPGA cloud host development method provided in any of the above example embodiments for the development management platform 500. The processors 502 are configured to execute the program stored in the memory 504.

The program includes one or more computer-readable instructions, wherein when the one or more computer-readable instructions are executed by the processors 502, the following steps may be implemented:

detecting, in response to a design file uploaded by a development device, validity of an actual constraint file included in the design file and corresponding to an FPGA of the FPGA cloud host;

synthesis processing the design file in response to detecting that the actual constraint file is valid;

feeding a synthesis report obtained from the synthesis processing back to the development device; and writing, in response to a writing instruction triggered by the development device, a burner file corresponding to the writing instruction and obtained from the synthesis processing into the FPGA.

For example, the processors 502 are further configured to perform all or some of the steps in the above methods.

A communication interface 506 may be further included in the structure of the development management platform, configured for the development management platform to communicate with another device or communication network, for example, communicate with the development device of the user.

In addition, a computer storage medium is provided in an example embodiment of the present disclosure, configured to store computer software instructions used by the development management platform, including a program for implementing the FPGA cloud host development method in the above method example embodiments.

Figure 6:
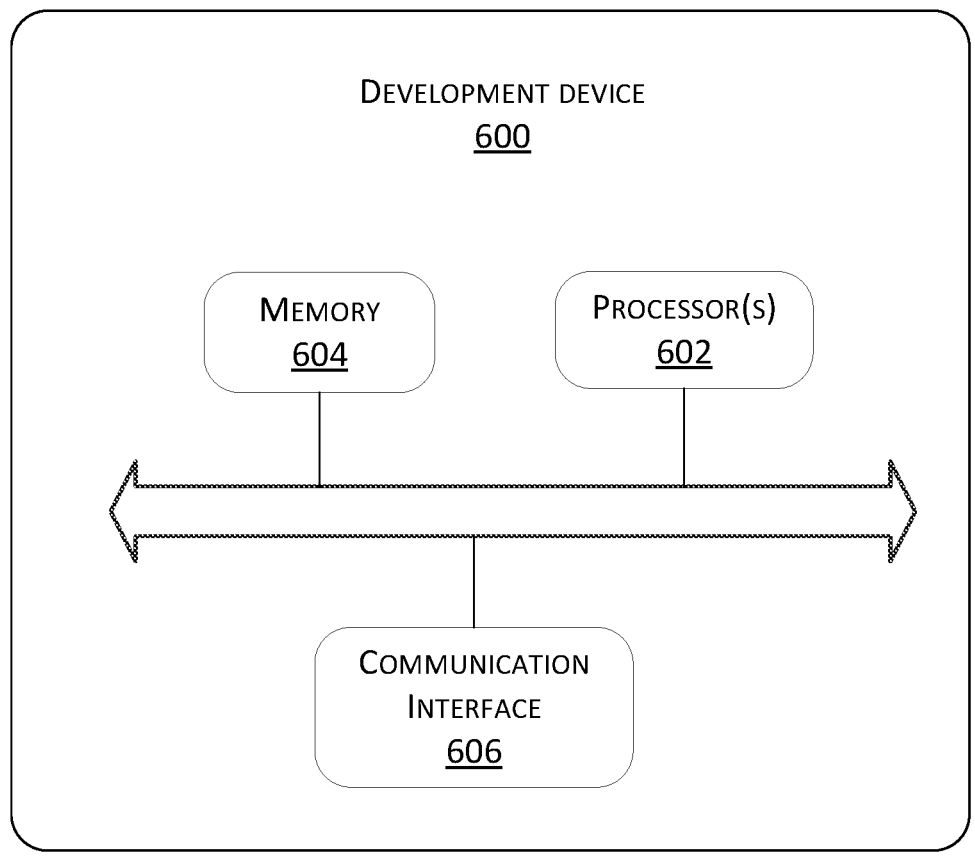
FIG. 6 is a schematic structural diagram of a development device according to an example embodiment of the present disclosure.

In addition, in an example design, the above development device is, for example, a PC. As shown in FIG. 6, the development device 600 may include one or more processors 602 and memory 604. The memory 604 is configured to store a program for supporting the development device to implement the FPGA cloud host development method provided in any of the above example embodiments for the development device 602. The processors 602 are configured to execute the program stored in the memory 604.

The program includes one or more computer-readable instructions, wherein when the one or more computer-readable instructions are executed by the processors 602, the following steps may be implemented:

uploading a design file to a development management platform, the design file including an actual constraint file corresponding to an FPGA of the FPGA cloud host, for detecting, by the development management platform, validity of the actual constraint file and synthesis processing the design file in response to detecting that the actual constraint file is valid;

receiving a synthesis report sent by the development management platform; and sending, to the development management platform, a writing instruction configured to instruct writing a burner file corresponding to the design file into the FPGA.

For example, the processors 602 are further configured to perform all or some of the steps in the above methods.

A communication interface 606 may be further included in the structure of the development device, configured for the development device to communicate with another device or communication network, for example, communicate with the development management platform.

In addition, a computer storage medium is provided in an example embodiment of the present disclosure, configured to store computer software instructions used by the development device, including a program for implementing the FPGA cloud host development method in the above method example embodiments.

From the description of the implementations above, those skilled in the art may clearly understand that the implementations may be implemented by software plus a necessary universal hardware platform, and definitely may also be implemented by a combination of hardware and software. Based on such understanding, the above technical solutions essentially, or the portion contributing to the prior art may be embodied in the form of a computer product. The present disclosure may be in the form of a computer program product implemented on one or more computer usable storage media (which includes, but is not limited to, a disk memory, a CD-ROM, an optical memory, or the like) including computer usable program code.

The present disclosure is described with reference to flowcharts and/or block diagrams of the method, the device (system), and the computer program product according to the example embodiments of the present disclosure. It should be understood that computer-readable instructions may be used to implement each process and/or block in the flowcharts and/or block diagrams and combinations of processes and/or blocks in the flowcharts and/or block diagrams. The computer-readable instructions may be provided to a general-purpose computer, a special-purpose computer, an embedded processor or a processor of another programmable data processing device to generate a machine, such that the computer or the processor of another programmable data processing device executes instructions to generate an apparatus configured to implement functions designated in one or more processes in a flowchart and/or one or more blocks in a block diagram.

The computer-readable instructions may also be stored in a computer readable memory that may guide the computer or another programmable data processing device to work in a specific manner, such that the instructions stored in the computer readable memory generates an article of manufacture including an instruction apparatus. The instruction apparatus implements functions designated by one or more processes in a flowchart and/or one or more blocks in a block diagram.

The computer-readable instructions may also be loaded in the computer or another programmable data processing device, such that a series of operation steps are implemented on the computer or another programmable device to generate a computer implemented processing, and therefore, the instructions executed in the computer or another programmable device provide steps for implementing functions designated in one or more processes in a flowchart and/or one or more blocks in a block diagram.

In a typical configuration, the computing device includes one or more processors (CPUs), an input/output interface, a network interface, and a memory.

The memory may include computer readable media such as a volatile memory, a Random Access Memory (RAM), and/or non-volatile memory, e.g., a Read-Only Memory (ROM) or a flash RAM. The memory is an example of a computer readable medium.

The computer readable medium includes non-volatile and volatile media as well as removable and irremovable media, and may implement information storage by means of any method or technology. The information may be a computer readable instruction, a data structure, and a module of a program or other data. An example of the storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

Finally, it should be noted that the above example embodiments are merely provided for describing the technical solutions of the present disclosure, but not intended to limit the present disclosure. It should be understood by those of ordinary skill in the art that although the present disclosure has been described in detail with reference to the above example embodiments, modifications may be made to the technical solutions described in the above example embodiments, or equivalent replacements may be made to some technical features in the technical solutions, as long as such modifications or replacements do not cause the essence of corresponding technical solutions to depart from the spirit and scope of the technical solutions in the example embodiments of the present disclosure.

The present disclosure may further be understood with clauses as follows.

Clause 1. An FPGA cloud host development method applied to a development management platform, the method comprising:

detecting, in response to a design file uploaded by a development device, validity of an actual constraint file included in the design file, the actual constraint file corresponding to an FPGA of the FPGA cloud host;

synthesis processing the design file in response to detecting that the actual constraint file is valid; and writing a burner file obtained from the synthesis processing into the FPGA.

Clause 2. The method of clause 1, wherein:

prior to the writing the burner file obtained from the synthesis processing into the FPGA, the method further comprises feeding a synthesis report obtained from the synthesis processing back to the development device; and the writing the burner file obtained from the synthesis processing into the FPGA comprises writing, in response to a writing instruction triggered by the development device, the burner file corresponding to the writing instruction into the FPGA.

Clause 3. The method of clause 1, wherein the detecting validity of the actual constraint file included in the design file comprises:

determining that the actual constraint file is valid in response to determining that a result of comparison between a template constraint file stored locally and the actual constraint file indicates that the template constraint file is consistent with the actual constraint file, the template constraint file corresponding to the FPGA.

Clause 4. The method of clause 3, wherein the method further comprises:

sending, in response to a development request triggered by the development device, the template constraint file to the development device.

Clause 5. The method of clause 1, wherein:

the synthesis processing the design file comprises, in response to determining that a third-party IP core is called in the design file, synthesis processing the called third-party IP core stored locally and the design file; and the feeding the synthesis report obtained from the synthesis processing back to the development device comprises:

feeding a predefined non-sensitive synthesis report obtained from the synthesis processing back to the development device, wherein the non-sensitive synthesis report does not include information of the called third-party IP core.

Clause 6. The method of clause 2, wherein the writing the burner file corresponding to the writing instruction into the FPGA comprises:

transmitting the burner file to a virtual machine manager corresponding to the FPGA cloud host for writing the burner file into the FPGA through the virtual machine manager.

Clause 7. An FPGA cloud host development method applied to a development device, the method comprising:

uploading a design file to a development management platform, wherein the design file includes an actual constraint file corresponding to an FPGA of the FPGA cloud host, for detecting, by the development management platform, validity of the actual constraint file and synthesis processing the design file in response to detecting that the actual constraint file is valid;

receiving a synthesis report sent by the development management platform; and sending, to the development management platform, a writing instruction triggered according to the synthesis report, wherein the writing instruction instructs to write a burner file corresponding to the design file into the FPGA.

Clause 8. The method of clause 7, wherein, prior to the uploading the design file to a development management platform, the method further comprises:

sending a development request to the development management platform in response to a development start operation; and receiving a template constraint file corresponding to the FPGA that is sent by the development management platform in response to the development request.

Clause 9. An FPGA cloud host development system comprising:

a development device;

a development management platform in remote communication with the development device; and an FPGA in an FPGA cloud host, wherein:

the development device is configured to design a design file including an actual constraint file corresponding to the FPGA, and upload the obtained design file to the development management platform; and the development management platform is configured to detect validity of the actual constraint file, synthesis process the design file in response to detecting that the actual constraint file is valid, and write a burner file obtained from the synthesis processing into the FPGA.

Clause 10. The system of clause 9, wherein:

the development device is further configured to receive a synthesis report obtained from the synthesis processing and fed back by the development management platform, and send a writing instruction triggered according to the synthesis report to the development management platform; and the development management platform is further configured to feed the synthesis report obtained from the synthesis processing back to the development device, and write the burner file into the FPGA according to the writing instruction.

Clause 11. The system of clause 9, wherein the development management platform is for example configured to:

compare a template constraint file stored locally with the actual constraint file, and determine that the actual constraint file is valid in response to determining that a result of comparison indicates that the template constraint file is consistent with the actual constraint file, wherein the template constraint file corresponds to the FPGA.

Clause 12. The system of clause 11, wherein:

the development device is further configured to send a development request to the development management platform in response to a development start operation; and the development management platform is further configured to send the template constraint file to the development device in response to the development request.

Clause 13. The system of clause 9, wherein:
the development management platform stores a third-party IP core; and
the development management platform is for example configured to
in response to determining that the third-party IP core is called in the design file, synthesis process the called third-party IP core and the design file, and feed a predefined non-sensitive synthesis report obtained from the synthesis processing back to the development device, wherein the non-sensitive synthesis report does not include information of the called third-party IP core.

Clause 14. The system of clause 9, further comprising:
a virtual machine manager configured to receive the burner file sent by the development management platform, and write the burner file into the FPGA.

Clause 15. The system of clause 9, further comprising:
a user virtual machine having a data access link with the FPGA, configured to deploy code in the design file and access the FPGA through the data access link.

Clause 16. A development management platform comprising:
a processor; and
a memory storing one or more computer-readable instructions that, when executed by the processor, implement the FPGA cloud host development method of any of clauses 1 to 6.

Clause 17. A development device comprising:
a processor; and
a memory storing one or more computer-readable instructions that, when executed by the processor, implement the FPGA cloud host development method of clause 7 or 8.

What is claimed is:

1. A method comprising:
   detecting, in response to a design file uploaded by a development device, validity of an actual constraint file included in the design file, the actual constraint file corresponding to a Field Programmable Gate Array (FPGA) of a FPGA cloud host;
   synthesis processing the design file in response to detecting that the actual constraint file is valid comprising:
      in response to determining that a locally stored and authorized third-party intellectual property (IP) core is called in the design file, synthesis processing the called third-party IP core and the design file;
   feeding a predefined non-sensitive synthesis report obtained from the synthesis processing back to the development device, wherein the non-sensitive synthesis report does not include information of the called third-party IP core; and
   writing a burner file obtained from the synthesis processing into the FPGA.

2. The method of claim 1, wherein:
   the writing the burner file obtained from the synthesis processing into the FPGA comprises writing, in response to a writing instruction triggered by the development device, the burner file corresponding to the writing instruction into the FPGA.

3. The method of claim 2, wherein the writing the burner file corresponding to the writing instruction into the FPGA comprises:
   transmitting the burner file to a virtual machine manager corresponding to the FPGA cloud host for writing the burner file into the FPGA through the virtual machine manager.

4. The method of claim 1, wherein the detecting the validity of the actual constraint file included in the design file comprises:
   determining that the actual constraint file is valid in response to determining that a result of comparison between a template constraint file stored locally and the actual constraint file indicates that the template constraint file is consistent with the actual constraint file, the template constraint file corresponding to the FPGA.

5. The method of claim 4, wherein the method further comprises:
   sending, in response to a development request triggered by the development device, the template constraint file to the development device.

6. A development device comprising:
   one or more processors; and
   one or more memories storing thereon computer-readable instructions that, when executed by the one or more processors, cause the one or more processors to perform acts comprising:
      uploading a design file to a development management platform;
      receiving a predefined non-sensitive synthesis report generated and sent by the development management platform, the predefined non-sensitive synthesis report generated, in response to determining that an authorized third-party intellectual property (IP) core is called in the design file, by synthesis processing the called third-party IP core and the design file wherein the non-sensitive synthesis report does not include information of the called third-party IP core; and
      sending, to the development management platform, a writing instruction triggered according to the predefined non-sensitive synthesis report, the writing instruction instructing to write a burner file corresponding to the design file into a Field Programmable Gate Array (FPGA).

7. The development device of claim 6, wherein the design file includes an actual constraint file corresponding to an FPGA of the FPGA cloud host, for detecting, by the development management platform, validity of the actual constraint file and synthesis processing the design file in response to detecting that the actual constraint file is valid.

8. The development device of claim 7, wherein, prior to the uploading the design file to the development management platform, the method further comprises:
   sending a development request to the development management platform in response to a development start operation; and
   receiving a template constraint file corresponding to the FPGA that is sent by the development management platform in response to the development request.

9. The development device of claim 8, wherein detecting, by the development management platform, the validity of the actual constraint file is based on determining that a result of comparison between the template constraint file and the actual constraint file indicates that the template constraint file is consistent with the actual constraint file.

10. A system comprising:
    a development management platform in remote communication with a development device that:
       detects validity of an actual constraint file;

synthesis processes a design file in response to detecting that the actual constraint file is valid comprising:
  in response to determining that an authorized third-party intellectual property (IP) core is called in the design file, synthesis processing the called third-party IP core and the design file, and
  feeds a predefined non-sensitive synthesis report obtained from the synthesis processing back to the development device, wherein the non-sensitive synthesis report does not include information of the called third-party IP core; and
  writes a burner file obtained from the synthesis processing into a Field Programmable Gate Array (FPGA).

11. The system of claim 10, wherein the development device:
  designs the design file including the actual constraint file corresponding to the FPGA; and
  uploads the obtained design file to the development management platform.

12. The system of claim 10, wherein:
  the development device sends a writing instruction triggered according to the predefined non-sensitive synthesis report to the development management platform.

13. The system of claim 12, wherein:
  the development management platform writes the burner file into the FPGA according to the writing instruction.

14. The system of claim 13, wherein the development management platform compares a template constraint file stored locally with the actual constraint file, and determines that the actual constraint file is valid in response to determining that a result of comparison indicates that the template constraint file is consistent with the actual constraint file, wherein the template constraint file corresponds to the FPGA.

15. The system of claim 10, wherein:
  the development device sends a development request to the development management platform in response to a development start operation.

16. The system of claim 15, wherein:
  the development management platform sends the template constraint file to the development device in response to the development request.

17. The system of claim 10, wherein:
  the development management platform stores the authorized third-party IP core.

18. The system of claim 10, further comprising:
  a virtual machine manager that receives the burner file sent by the development management platform, and writes the burner file into the FPGA; and
  a user virtual machine having a data access link with the FPGA, that deploys code in the design file and accesses the FPGA through the data access link.

* * * * *